United States Patent
Terao

(10) Patent No.: US 9,759,951 B2
(45) Date of Patent: Sep. 12, 2017

(54) ELECTRO-OPTICAL DEVICE AND ELECTRONIC APPARATUS

(71) Applicant: Seiko Epson Corporation, Tokyo (JP)

(72) Inventor: Koichi Terao, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 19 days.

(21) Appl. No.: 14/215,172

(22) Filed: Mar. 17, 2014

(65) Prior Publication Data

US 2014/0293211 A1   Oct. 2, 2014

(30) Foreign Application Priority Data

Mar. 26, 2013   (JP) ................................. 2013-063534

(51) Int. Cl.
*G02F 1/1339*   (2006.01)
*G02F 1/1341*   (2006.01)
*G02F 1/01*   (2006.01)

(52) U.S. Cl.
CPC .......... *G02F 1/1339* (2013.01); *G02F 1/0107* (2013.01); *G02F 1/1341* (2013.01)

(58) Field of Classification Search
CPC .. G02F 1/0107; G02F 1/1339; G02F 1/13392; G02F 1/13394; G02F 1/161; G02F 1/133377; G02F 2001/13396; G02F 2001/13398; G02F 1/133707; H01L 27/3246
See application file for complete search history.

(56) References Cited

U.S. PATENT DOCUMENTS

| 6,184,954 B1* | 2/2001 | Inoue .................... G02F 1/1339 349/153 |
| 7,940,366 B2* | 5/2011 | Watanabe ......... G02F 1/133305 349/150 |
| 8,848,155 B2* | 9/2014 | Togashi et al. ............... 349/155 |
| 2002/0196393 A1* | 12/2002 | Tashiro ................. G02F 1/1303 349/106 |
| 2004/0061920 A1* | 4/2004 | Tonar ...................... B32B 17/06 359/265 |
| 2004/0095537 A1 | 5/2004 | Akagi et al. |

(Continued)

FOREIGN PATENT DOCUMENTS

| JP | 61-029821 A | 2/1986 |
| JP | 08-094985 A | 4/1996 |

(Continued)

OTHER PUBLICATIONS

English translation of JP2009080396, Title: Liquid Crystal Display Device, Author: Sasaki, Takeshi; Date of publication: Apr. 16, 2009.*

*Primary Examiner* — Dung Nguyen
*Assistant Examiner* — Shan Liu
(74) *Attorney, Agent, or Firm* — ALG Intellectual Property, LLC

(57) ABSTRACT

A liquid crystal device includes an element substrate, a counter substrate, a liquid crystal disposed between the substrates, a sealing material disposed in the spacing between the element substrate and the counter substrate and sealing the liquid crystal, a gas barrier layer disposed outside of the sealing material to cover the outside of the spacing and having a portion located in the spacing, and an gap region defined in at least a portion of the space between the sealing material and the gas barrier layer.

8 Claims, 10 Drawing Sheets

(56) References Cited

U.S. PATENT DOCUMENTS

| | | | |
|---|---|---|---|
| 2004/0207797 A1* | 10/2004 | Sakurada | G02F 1/1341 349/153 |
| 2008/0164808 A1* | 7/2008 | Kim et al. | 313/504 |
| 2010/0101648 A1* | 4/2010 | Morooka et al. | 136/261 |
| 2012/0080671 A1* | 4/2012 | Niboshi et al. | 257/40 |
| 2013/0050605 A1* | 2/2013 | Moriwaki | G02F 1/1339 349/43 |
| 2013/0182199 A1* | 7/2013 | Hosoya | G02F 1/1345 349/61 |
| 2014/0063432 A1* | 3/2014 | Yamazaki et al. | 349/153 |

FOREIGN PATENT DOCUMENTS

| | | | |
|---|---|---|---|
| JP | 2004-045784 A | | 2/2004 |
| JP | 2006-164691 A | | 6/2006 |
| JP | 2006-267532 A | | 10/2006 |
| JP | 2007-047253 A | | 2/2007 |
| JP | 2008-250120 A | | 10/2008 |
| JP | 2009080396 A | * | 4/2009 |
| JP | 2009-163082 A | | 7/2009 |
| JP | 2012-109257 A | | 6/2012 |

* cited by examiner

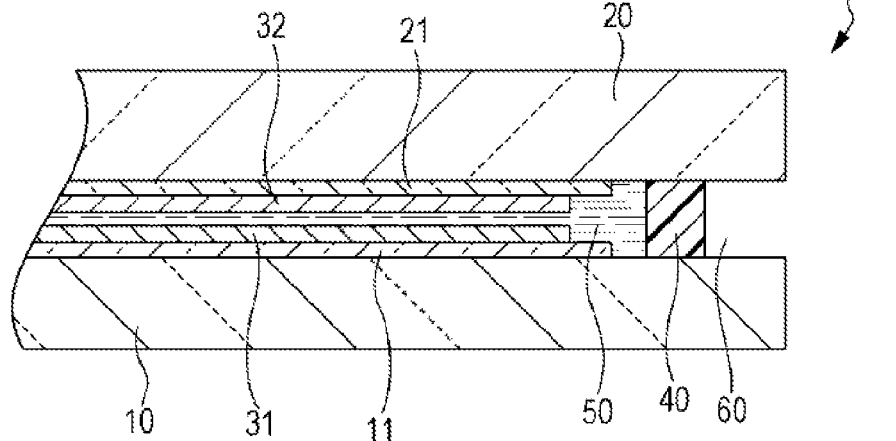
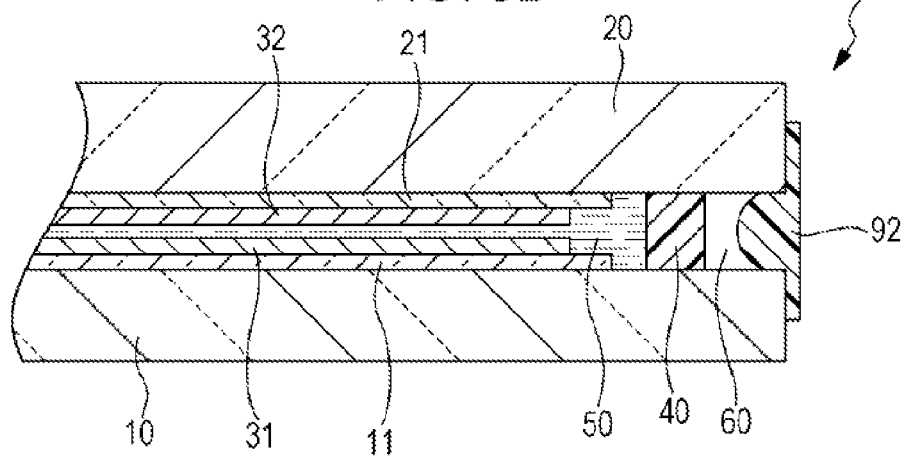
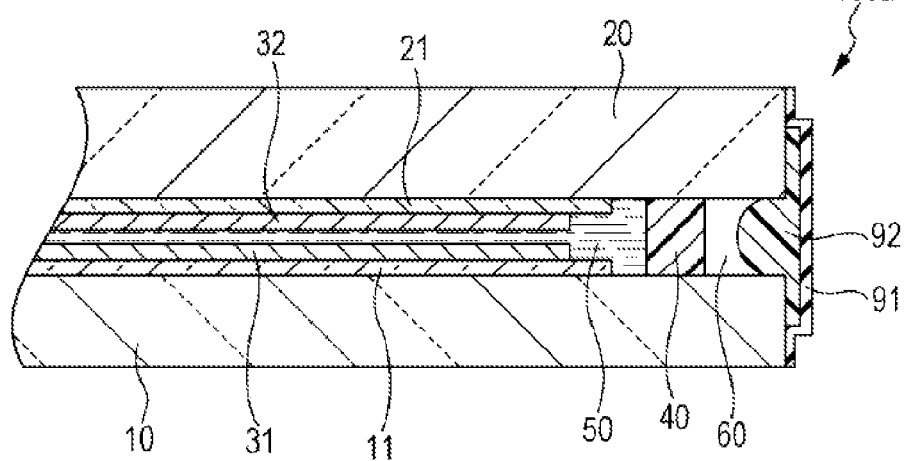

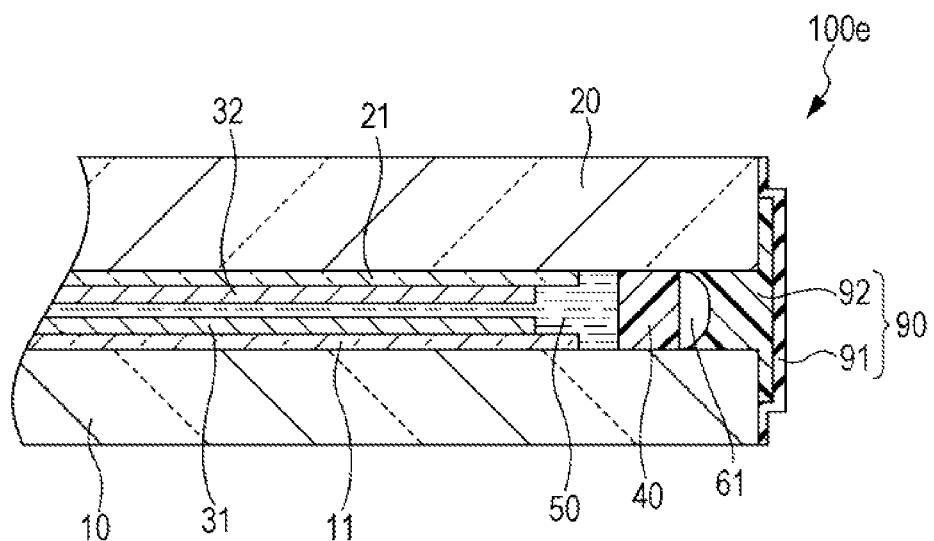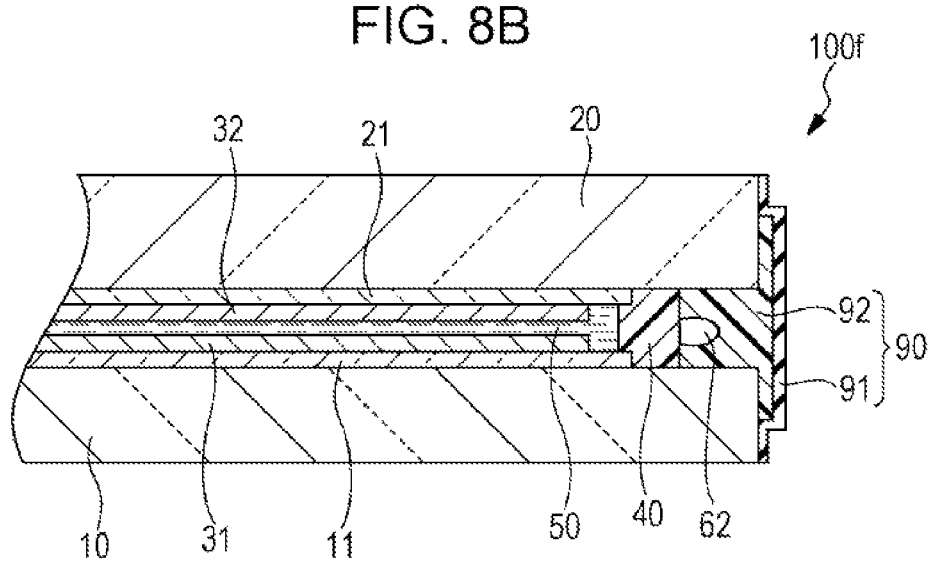

ELECTRO-OPTICAL DEVICE AND ELECTRONIC APPARATUS

BACKGROUND

1. Technical Field

The present invention relates to electro-optical devices and electronic apparatuses including the electro-optical devices.

2. Related Art

In general, liquid crystal devices used as optical modulators mounted on such apparatuses as liquid crystal projectors, or used as direct-view display devices mounted on such apparatuses as mobile phones are basically composed of a pair of substrates having electrodes. Conductive films (such as pixel electrodes and counter electrodes) and, in the case of liquid crystal devices, alignment layers for controlling the initial alignment of liquid crystal molecules are formed on the respective inner sides of the pair of substrates. The pair of these substrates are coupled together through, for example, a sealing material, and thereby the substrates are bonded to each other. To constitute a liquid crystal device, a liquid crystal is sealed in the region enclosed by the sealing material.

As devices such as liquid crystal devices are enhanced to display images with higher definition or are reduced in size, studies have been carried out to reduce the distance (the seal thickness) of the sealing material from the inside to the outside with respect to the liquid crystal. However, reducing this distance results in a problem that the moisture proofness of the seal is deteriorated. In detail, when such liquid crystal devices are used in hot and humid environments, water in the air may penetrate the liquid crystal through the sealing material and may adversely affect the alignment of the liquid crystal. Any changes in the alignment of liquid crystal cause display defects such as uneven brightness.

Techniques for solving such problems are disclosed in, for example, JP-A-2009-163082, which proposes a liquid crystal device that realizes high gas barrier properties by having a gas barrier member disposed to cover the exterior side of a sealing material as well as the lateral side of a substrate and further by covering the outer surface of the gas barrier member with an inorganic gas barrier layer.

Although the liquid crystal device disclosed in JP-A-2009-163082 achieves improved moisture proofness by the configuration in which the inorganic gas barrier layer is disposed on the outer surface of the gas barrier member formed of a moistureproof resin, the application of heat to the liquid crystal device during the formation of the inorganic gas barrier layer causes the occurrence of outgassing or the elution of impurities from the resinous sealing material and gas barrier member. The elution of impurities or the outgassing from resin components of sealing materials causes the liquid crystal to be out of alignment at the boundary between the liquid crystal and the seal, thus possibly resulting in display defects such as uneven brightness.

SUMMARY

An advantage of some aspects of the invention is that an electro-optical device such as a liquid crystal device is provided in which a pair of substrates are bonded to each other through a sealing material which seals a liquid crystal with such a configuration that the generation of impurities or outgassing from the sealing material is reduced to achieve improved moisture proofness and to allow the thickness of the sealing material to be reduced, thereby allowing for the realization of the displaying of images with higher definition and the miniaturization of devices. Another advantage of the invention is that a method for manufacturing such electro-optical devices, and an electronic apparatus including the electro-optical device are provided.

According to an aspect of the invention, an electro-optical device includes a first substrate, a second substrate, an electro-optical substance disposed between the substrates, a sealing material disposed in the spacing between the first substrate and the second substrate and surrounding the periphery of the electro-optical substance, a moistureproof resin layer disposed outside of the sealing material and having a portion located in the spacing, and an gap region defined in at least a portion of the space between the sealing material and the moistureproof resin layer.

According to the electro-optical device in one aspect of the invention, the gap region disposed between the sealing material surrounding the periphery of the electro-optical substance and the moistureproof resin layer can trap a gas generated from the resin component such as the moistureproof resin layer or the sealing material and can thereby suppress the generation of bubbles in the electro-optical substance. Further, uncured components or nonvolatile impurities eluted from the moistureproof resin layer can also be trapped in the gap region. Thus, the electro-optical substance, for example, a liquid crystal, can be suppressed from misalignment by the influence of outgassing and impurities.

In the above aspect of the invention, the electro-optical device preferably includes an inorganic film layer disposed outside of the moistureproof resin layer and at least partially in contact with the outer surface of the moistureproof resin layer. In this case in which the inorganic film layer is further disposed outside of the moistureproof resin layer, the moistureproof resin layer may be formed in such a manner that the moistureproof resin impregnates the spacing between the pair of substrates to facilitate the formation of the inorganic film layer. Thus, the inorganic film layer disposed on the outer surface of the moistureproof resin layer provides higher moisture proofness than obtained with the moistureproof resin layer alone.

In the above aspect of the invention, it is preferable that the moistureproof resin layer in the electro-optical device include at least one of a one-part photocurable resin, a photo- and heat-curable resin and a two-part cold-curable resin, and be electrically insulating. According to this configuration in which the moistureproof resin layer is formed of a photocurable resin, a photo- and heat-curable resin or a two-part cold-curable resin, the moistureproof resin layer can be applied to fill the spacing and cured without applying extra thermal load to the panel or with minimum thermal load. Because the moistureproof resin layer can be formed in this manner, impurities are prevented from being eluted from the sealing material and entering into the electro-optical substance. In particular, when the electro-optical substance is a liquid crystal, the misalignment of the liquid crystal can be suppressed by this configuration.

In more detail, the moistureproof resin layer preferably includes an epoxy resin or a modified epoxy resin. Because epoxy resins and modified epoxy resins are excellent electrical insulators and have low cure shrinkage and low moisture absorption, this configuration is advantageous to prevent conduction failure and to improve moisture proofness.

In the above electro-optical device in one aspect of the invention, it is preferable that the sealing material include a gap material and that the moistureproof resin layer include filler particles and the diameter of the filler particles be smaller than the diameter of the gap material. According to this configuration in which the filler component contained in the moistureproof resin material has a smaller particle diameter than the gap material contained in the sealing material, it becomes more easy for the moistureproof resin layer to impregnate the spacing between the two substrates and to fill the spacing while leaving the gap region; further, the filler component enhances the moisture proofness of the moistureproof resin material.

In the above electro-optical device in one aspect of the invention, the inorganic film layer preferably has a film thickness of not less than 0.1 µm and not more than 2.5 µm. According to this configuration in which the film thickness of the inorganic film layer is regulated to be from 0.1 µm to 2.5 µm, films that are dense without pinholes or cracks and have high moisture proofness can be obtained. While inorganic films with a thickness of larger than 2.5 µm exhibit higher moisture proofness, the formation of such thick films incurs problems such as that the thermal load applied to liquid crystal panels or moistureproof resin layers during film production is increased, and that the flexibility of the inorganic films themselves is deteriorated.

In the above electro-optical device in one aspect of the invention, the inorganic film layer preferably includes aluminum or chromium. According to this configuration, the moisture proofness can be further enhanced.

In the above aspect of the invention, the electro-optical device preferably includes a hybrid moistureproof layer disposed to cover the outer surface of the inorganic film layer and including an organic inorganic hybrid material. Here, the term "organic inorganic hybrid material" refers to a material having a molecule in which both an organic component and an inorganic component are present. According to this configuration, the moisture proofness can be improved compared to when there is only the inorganic material.

According to another aspect of the invention, an electronic apparatus includes any of the above electro-optical devices according to one aspect of the invention. The electro-optical devices according to one aspect described above have high moisture proofness and can suppress the occurrence of display defects by preventing the liquid crystal from being misaligned. Thus, according to the invention, various electronic apparatuses with excellent display characteristics can be realized such as projection display devices, optical pickups, television sets, mobile phones, electronic notebooks, word processors, view-finder or monitor-direct-view video tape recorders, workstations, videophones, POS terminals and touch panels.

According to a further aspect of the invention, a method for manufacturing the electro-optical devices includes bonding the first substrate and the second substrate to each other through the sealing material, and forming a barrier layer by forming the moistureproof resin layer at the outside of the sealing material such that a portion of the layer is located in the spacing and such that the gap region is formed in at least a portion of the space between the sealing material and the moistureproof resin layer.

In the above method for manufacturing the electro-optical devices in the further aspect of the invention, the barrier layer is formed in such a manner that the gap region is formed between the sealing material and the moistureproof resin layer disposed to cover the spacing on the exterior side between the first substrate and the second substrate. According to this configuration, the gap region can trap a gas generated from the resin component such as the moistureproof resin layer or the sealing material and can thereby suppress the generation of bubbles in the electro-optical substance. Further, uncured components or nonvolatile impurities eluted from the moistureproof resin layer can also be trapped in the gap region. Thus, the electro-optical substance, in particular, a liquid crystal, can be suppressed from misalignment of liquid crystal by the influence of outgassing and impurities.

In the above method for manufacturing the electro-optical devices in the further aspect of the invention, it is preferable that the barrier layer be formed in such a manner that an inorganic film layer is further formed outside of the moistureproof resin layer and at least partially in contact with the moistureproof resin layer. According to this configuration in which the inorganic film layer is further formed outside of the moistureproof resin layer, the moistureproof resin layer may be formed in such a manner that the moistureproof resin impregnates the spacing between the pair of substrates and the outer surface thereof is planarized to facilitate the formation of the inorganic film layer. Thus, higher moisture proofness than obtained with the moistureproof resin layer alone can be obtained.

In the above method for manufacturing the electro-optical devices in the further aspect of the invention, it is preferable that the barrier layer be formed in such a manner that a hybrid moistureproof layer including an organic inorganic hybrid material is further formed to cover the outer surface of the inorganic film layer. According to this configuration, the moisture proofness can be improved compared to when there is only the inorganic material.

In the above method for manufacturing the electro-optical devices in the further aspect of the invention, it is preferable that the barrier layer be formed in such a manner that the inorganic film layer is formed by a deposition method or an ion-assisted deposition method. According to this configuration in which the inorganic film layer is formed by a deposition method or an ion-assisted deposition method, the thermal load applied to the panel or the moistureproof resin layer during the formation of the inorganic film layer can be reduced. In particular, when the electro-optical substance is a liquid crystal, the misalignment of the liquid crystal due to the elution of impurities into the liquid crystal layer can be suppressed.

BRIEF DESCRIPTION OF THE DRAWINGS

The invention will be described with reference to the accompanying drawings, wherein like numbers reference like elements.

FIGS. 3A to 3C are schematic sectional views illustrating a method for manufacturing the liquid crystal device according to the first embodiment.

FIGS. 8A and 8B are schematic sectional views illustrating structures of liquid crystal devices according to modified embodiments.

DESCRIPTION OF EXEMPLARY EMBODIMENTS

Hereinbelow, preferred exemplary embodiments of the invention will be described in detail with reference to references such as the attached drawings. The sizes and scales of components in the figures are appropriately changed from the actual sizes and scales. The embodiments discussed below represent preferred embodiments of the invention and contain various technical preferred limitations. However, the scope of the invention is not limited to such embodiments as long as there is no particular mentioning in the following description that the scope of the invention is limited.

A: First Embodiment
Configuration of Liquid Crystal Device

Figure 1:
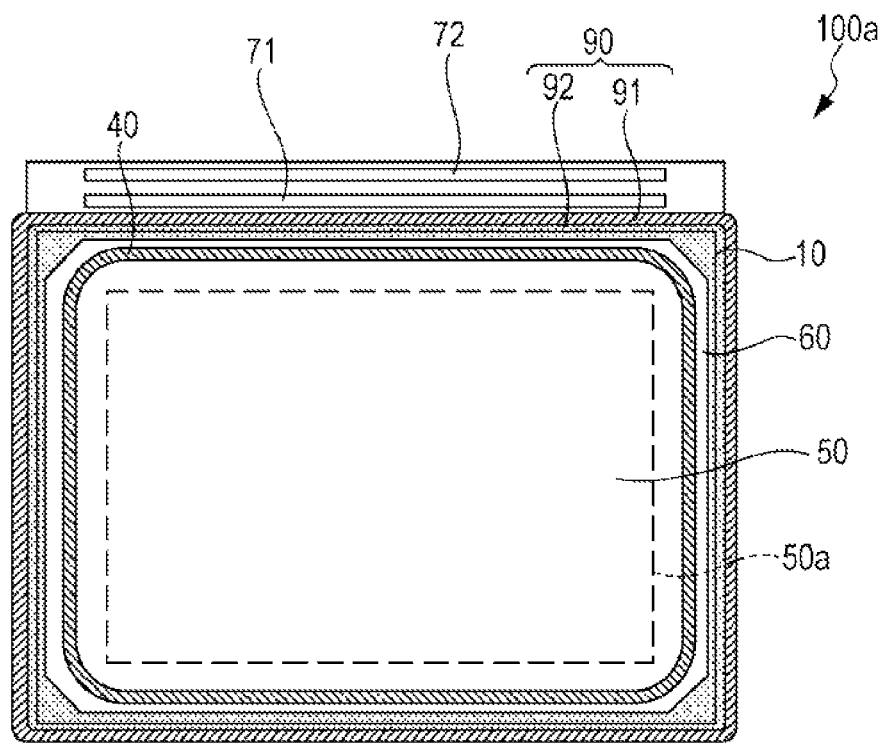
FIG. 1 is a schematic plan view illustrating a structure of a liquid crystal device according to a first embodiment of the invention.
Figure 2:
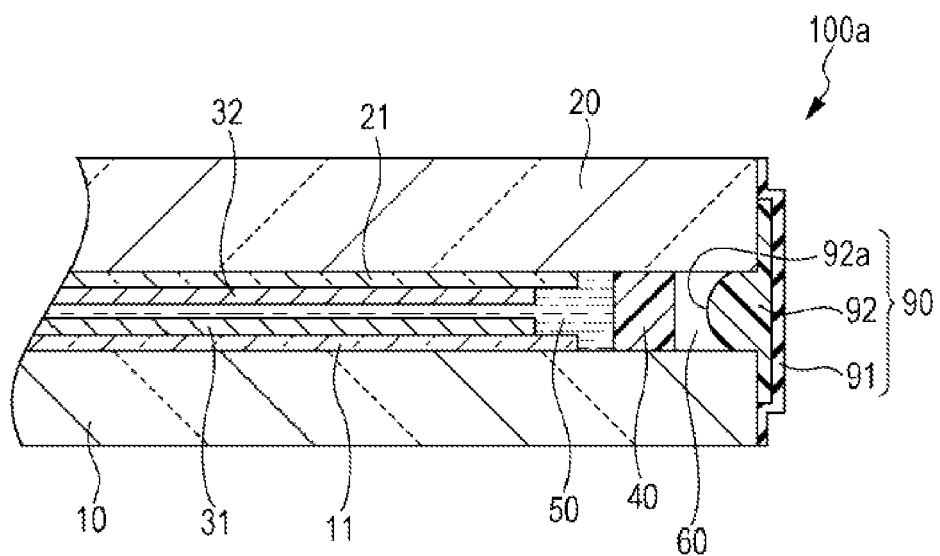
FIG. 2 is a schematic sectional view illustrating a moistureproof structure of the liquid crystal device according to the first embodiment.

FIG. 1 is a schematic plan view illustrating a structure of a liquid crystal device as an example of electro-optical devices of the invention. FIG. 2 is a schematic sectional view illustrating part of the structure of the liquid crystal device as an example of electro-optical devices of the invention. Hereinbelow, the structure of a liquid crystal device 100a will be described with reference to FIGS. 1 and 2.

In this embodiment, the liquid crystal device 100a is one used in, for example, a light valve of a liquid crystal projector. For example, the liquid crystal device 100a is a TFT (thin film transistor) active matrix liquid crystal device having TFT elements as pixel switching elements.

In the liquid crystal device 100a, an element substrate (a first substrate) 10 and a counter substrate (a second substrate) 20 are bonded to each other through a sealing material 40 that is in the form of substantially rectangular frame in a plan view. A liquid crystal 50 is sealed and retained in a region defined by the sealing material 40.

The element substrate 10 and the counter substrate 20 are, for example, glass substrates or quartz substrates. This pair of substrates 10 and 20 are bonded together by a one drop filling (ODF) method.

For example, the sealing material 40 is an adhesive including a photocurable resin or a heat-curable resin. The sealing material 40 is arranged between a lateral side 12 of the element substrate 10 and the liquid crystal 50. The thickness between the pair of substrates is, for example, 1.5 μm to 3.5 μm.

A peripheral break line (not shown) made of a light-shielding material is disposed in a region inside of the sealing material 40. On the other hand, a data line driving circuit 71 and a mounting terminal 72 are disposed in a region outside of the sealing material 40 along one side of the element substrate 10, and scanning line driving circuits (not shown) are disposed along the two sides adjacent to the above one side. Along the remaining side of the element substrate 10, a plurality of wires (not shown) are disposed which connect the scanning line driving circuits on both sides of an image display region. Further, substrate-conducting materials composed of conductive particles are disposed at the corners of the counter substrate 20 to establish an electrical conduction between the element substrate 10 and the counter substrate 20.

The image display region 50a is composed of a plurality of pixels arranged in a matrix. The pixels include pixel electrodes and TFT elements that are switching elements for controlling the pixel electrodes. Data lines to which image signals are supplied are electrically connected to the sources of the TFT elements. The image signals are supplied to the data lines successively in order, or are supplied in a group to a plurality of data lines adjacent to each other. With this configuration, the alignment or the order of a collection of molecules is changed in accordance with the level of voltage applied to the liquid crystal 50, and this allows light to be modulated and images to be gradated.

As illustrated in FIG. 2, a conductive film (pixel electrodes) 11 and an alignment layer 31 for controlling the alignment of liquid crystal molecules in the liquid crystal 50 in the absence of applied voltage are disposed on the surface of the element substrate 10 on the liquid crystal 50 side. On the surface of the element substrate 10 opposite to the liquid crystal 50 side, a polarizer selectively transmitting a prescribed polarized light and optionally a dustproof plate are arranged.

On the other hand, a conductive film (a common electrode) 21 and an alignment layer 32 for controlling the alignment of liquid crystal molecules in the liquid crystal 50 in the absence of applied voltage are disposed on the surface of the counter substrate 20 on the liquid crystal 50 side. On the surface of the counter substrate 20 opposite to the liquid crystal 50 side, a polarizer selectively transmitting a prescribed polarized light and optionally a dustproof plate are arranged.

For example, the conductive films 11 and 21 are transparent conductive materials such as tin-doped indium oxide films (ITO films). Other known various conductive films having translucency and conductivity such as IZO films and FTO films may be used. In the case where translucency is not required, known various conductive films having excellent conductivity may be used. ITO films may be formed by methods such as deposition, sputtering and calcination (or coating pyrolysis).

To form an ITO film by sputtering, the surface temperature of the substrate is set to a prescribed temperature (for example, 200° C.) and an ITO transparent conductive film including indium oxide and tin oxide is formed in a prescribed film thickness (for example, 0.05 μm to 10 μm) and is heat treated by being held at a prescribed temperature (for example, 200° C. to 250° C.) for a prescribed time (for example, 60 minutes). Thereafter, the film is patterned into a desired planar shape by a photolithographic process as required.

To form an ITO film by calcination, a liquid material for the formation of the ITO film is applied onto the substrate and the wet coating is then heat treated. The formation of conductive films by a liquid phase method is advantageous to reduce production costs. The liquid material may be applied by a technique such as ink jetting, Cap coating or spin coating. An example of the liquid material is a solution of an organic indium compound and an organic tin compound dissolved in an organic solvent in the presence of an organic amine. The use of such a liquid material is advantageous in that calcination is feasible at a relatively low temperature (for example, 250° C. or less). Alternatively, a translucent conductive film with excellent conductivity may be obtained even at a relatively low calcination temperature (for example, 250° C. or less) by forming a fine particle film containing translucent conductive fine particles on the substrate, thereafter impregnating the fine particle film, through the upper surface thereof, with a solution of translucent conductive fine particles in an organic solvent, and heat treating (calcining) the resultant film.

The alignment layers 31 and 32 may be any of organic alignment layers and inorganic alignment layers. For example, the organic alignment layers may be formed by performing an alignment treatment such as rubbing on the surface of polymer films such as polyimide films. The inorganic alignment layers have higher light resistance and heat resistance than the organic alignment layers, and thus may be formed by depositing or sputtering inorganic films such as $SiO_2$ and performing an alignment treatment by illuminating the surface of the inorganic films with ion beams or particle beams. Alternatively, the inorganic alignment layers may be formed by a so-called oblique deposition method in which inorganic materials are caused to fall at an oblique angle relative to the substrate so as to form films having an oblique columnar structure.

A gas barrier layer 90 as a moistureproof layer is disposed on the lateral sides of the element substrate 10 and the counter substrate 20. Members constituting the gas barrier layer 90 have water impermeable and moisture impermeable functions, namely, have very low permeability, in particular to water and moisture, and thus excellently prevent the penetration of water and moisture at areas covered with these members.

In this embodiment, the gas barrier layer 90 is disposed so as to cover the outside of the spacing between the element substrate 10 and the counter substrate 20. As illustrated in FIG. 2, the gas barrier layer 90 is composed of a moistureproof resin layer 92 disposed on the sealing material 40 side and an inorganic film layer 91 disposed outside of the moistureproof resin layer 92 and at least partially in contact with the moistureproof resin layer 92.

In this embodiment, as illustrated in FIG. 1, the moistureproof resin layer 92 is disposed to cover the entirety of the outer periphery of the pair of opposed substrates 10 and 20. Further, as illustrated in FIG. 2, the moistureproof resin layer 92 has a shape in which an inner portion 92a of the moistureproof resin layer 92 opposed to the sealing material 40 is curved outwardly toward the sealing material 40, and an outer portion is flat as a result of planarization treatment. On the other hand, the inorganic film layer 91 is disposed to cover the entirety of the planarized side of the moistureproof resin layer 92 from outside.

For example, the moistureproof resin layer 92 is formed of a one-part photocurable resin, a photo- and heat-curable resin or a two-part cold-curable resin. Epoxy resins and modified epoxy resins are examples of such resins. The moistureproof resin layer 92 may be cured under relatively low temperature conditions (100° C. or less). On the other hand, the inorganic film layer 91 is formed of an electrically insulating material, for example, silicon oxide such as SiO or $SiO_2$ or alumina, or an electrically conductive material such as aluminum or chromium. The film thickness of the inorganic film layer 91 may be not less than 0.1 μm and not more than 2.5 μm, and preferably not less than 0.3 μm and not more than 2 μm. The inorganic film layer 91 may be formed by a deposition method or an ion-assisted deposition method.

Between the sealing material 40 and the gas barrier layer 90, as illustrated in FIG. 2, an gap region 60 is defined which is curved inwardly away from the gas barrier layer 90. In this embodiment, as illustrated in FIG. 2, the gap region 60 is a space in its entirety in which there is no contact between the lateral side of the sealing material 40 and the inner surface of the moistureproof resin layer 92 in a side view. Further, as illustrated in FIG. 1, the gap region 60 is defined in a frame shape enclosing the entirety of the outer periphery of the sealing material 40 in a plan view.

Manufacturing Methods

Next, there will be described an example of the methods for manufacturing the liquid crystal device 100a described above. FIGS. 3A to 3C are schematic sectional views illustrating an exemplary method for manufacturing the liquid crystal device 100a according to this embodiment.

First, a step is performed in which electrodes are formed on a pair of substrates 10 and 20. In this step, semiconductor layers and various wires such as scanning lines and signal lines, which are all not shown, are formed on the surface of the element substrate 10 by known methods, thereafter a plurality of pixel electrodes are formed on the substrate surface by a known method, and a light-shielding film and a common electrode are formed on the surface of the counter substrate 20 by known methods.

Next, as illustrated in FIG. 3A, a bonding step is performed in which a liquid crystal 50 is arranged between the element substrate 10 and the counter substrate 20, and the element substrate 10 and the counter substrate 20 are bonded to each other through a sealing material 40. In this step, the sealing material 40 is applied onto the substrates so as to be located between the lateral sides of the pair of substrates 10 and 20 and the liquid crystal 50.

Further, a barrier layer formation step is performed in which a gas barrier layer 90 is formed to cover the outside of the spacing between the element substrate 10 and the counter substrate 20 and such that a portion of the layer is located in the spacing. In this barrier layer formation step, as illustrated in FIG. 3B, a moistureproof resin layer 92 is first arranged between the lateral sides of the pair of substrates 10 and 20 and the sealing material 40. Here, the moistureproof resin layer 92 is formed such that an gap region 60 is defined in at least a portion of the space between the sealing material 40 and the gas barrier layer 90. After the moistureproof resin layer 92 is formed between the pair of substrates 10 and 20, an outer portion of the moistureproof resin layer 92 is subjected to a planarization treatment.

Thereafter, as illustrated in FIG. 3C, an inorganic film layer 91 is formed to cover the entirety of the moistureproof resin layer 92 from outside. The inorganic film layer 91 may be formed by a deposition method or an ion-assisted deposition method. For example, the inorganic film layer 91 may be formed of an electrically insulating material with a film thickness of not less than 0.1 μm and not more than 2.5 μm. A liquid crystal device 100a is manufactured through the above procedures.

Functions and Effects

According to this embodiment, the gap region 60 is disposed between the sealing material 40 sealing the liquid crystal and the gas barrier layer 90 covering the outside of the spacing between the pair of substrates 10 and 20. Because of this configuration, a gas generated from the resin component such as the gas barrier layer 90 or the sealing material 40 can be trapped by the gap region 60, and thereby the generation of bubbles in the liquid crystal 50 can be suppressed. Further, uncured components or nonvolatile impurities eluted from the moistureproof resin layer 92 can also be trapped by the gap region 60. Thus, the liquid crystal can be suppressed from misalignment by the influence of outgassing and impurities. That is, this configuration makes it possible to suppress the occurrence of display defects such as stains, unevenness and domains due to the entry of gas or impurities generated from the sealing material 40 into the liquid crystal 50 and the spreading of such substances from the seal end toward the inside of the display region.

In this embodiment, the gas barrier layer 90 is a composite layer including the moistureproof resin layer 92 and the inorganic film layer 91. The moistureproof resin is allowed to impregnate the spacing between the pair of substrates, and the outer portion thereof is planarized to facilitate the formation of the inorganic film layer 91. Further, the inorganic film layer 91 disposed on the outer surface of the moistureproof resin layer 92 provides higher moisture proofness than obtained with the moistureproof resin layer 92 alone.

In this embodiment, the moistureproof resin layer 92 is formed of a material which includes at least one of a one-part photocurable resin, a photo- and heat-curable resin and a two-part cold-curable resin, and is electrically insulating. According to this configuration, conduction failures can be prevented from occurring at panel terminals or wires exposed at substrate ends. In addition, such a moistureproof resin layer 92 can be applied to fill the spacing and cured without applying extra thermal load to the liquid crystal panel or with minimum thermal load. As a result, impurities are prevented from being eluted from the sealing material 40 and entering into the liquid crystal 50, and thus the misalignment of the liquid crystal can be suppressed.

In this embodiment, the film thickness of the inorganic film layer 91 is controlled to be not less than 0.1 μm and not more than 2.5 μm, and preferably not less than 0.3 μm and not more than 2 μm. With this configuration, films that are dense without pinholes and have high moisture proofness can be obtained.

Further, the inorganic film layer 91 in this embodiment is formed by a deposition method or an ion-assisted deposition method. Thus, the thermal load applied to the liquid crystal 50 or the moistureproof resin layer 92 during the formation of the inorganic film layer 91 can be reduced as much as possible, and the misalignment of the liquid crystal can be suppressed as a result.

The liquid crystal device 100a according to this embodiment successfully achieved high moisture proofness, and prevented the misalignment of liquid crystal and suppressed the occurrence of display defects. In detail, the liquid crystal device 100a was tested to evaluate the reliability of moisture proofness. The liquid crystal device 100a was stored in an environment at a temperature of 60° C. and a humidity of 90% for 1000 hours, and the image displayed on the liquid crystal device 100a after the storage under these testing conditions was inspected to evaluate the moisture proofness. In the test, it was confirmed that the liquid crystal device 100a suppressed the occurrence of display defects such as stains, unevenness and domains more reliably than liquid crystal devices having no gas barrier layers.

B: Second Embodiment

Figure 4:
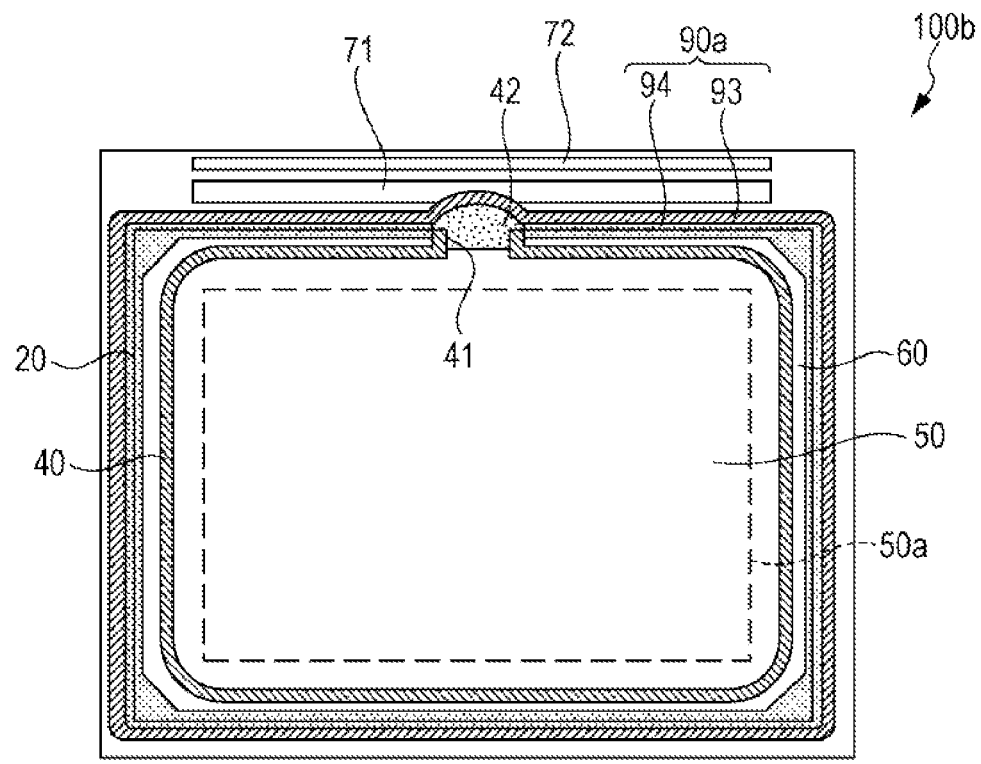
FIG. 4 is a schematic plan view illustrating a structure of a liquid crystal device according to a second embodiment of the invention.
Figure 5:
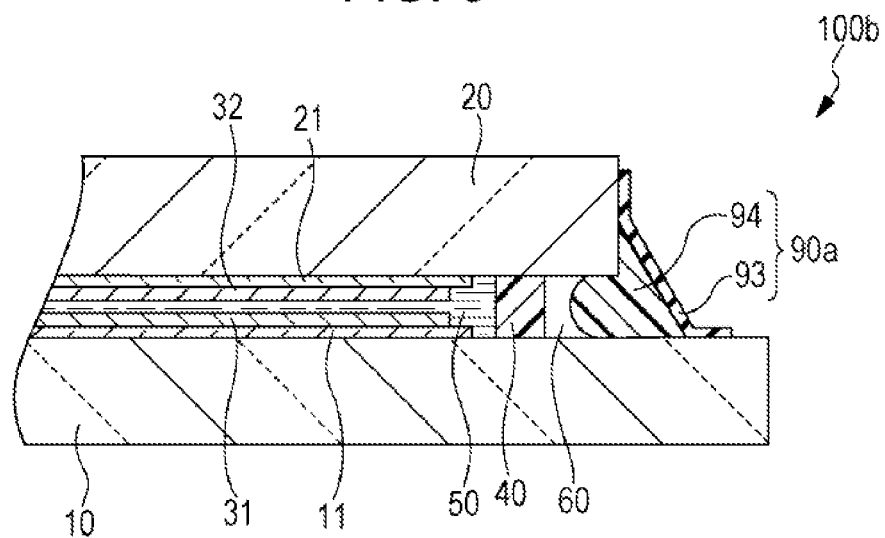
FIG. 5 is a schematic sectional view illustrating a moistureproof structure of the liquid crystal device according to the second embodiment.

The configuration of a liquid crystal device 100b according to the second embodiment is similar to that of the liquid crystal device 100a of the first embodiment described with reference to FIGS. 1 to 3C, except that while the gas barrier layer 90 in the liquid crystal device 100a of the first embodiment is formed with respect to the aligned lateral sides of the pair of substrates 10 and 20, a gas barrier layer 90a in the liquid crystal device 100b of the second embodiment is formed with respect to misaligned lateral sides of the substrates. FIG. 4 is a schematic plan view illustrating an example of the structure of the liquid crystal device according to the second embodiment of the invention. FIG. 5 is a schematic sectional view illustrating an example of the moistureproof layers in the liquid crystal device according to the second embodiment.

In the liquid crystal device 100b of this embodiment, as illustrated in FIG. 4, a counter substrate 20 and an element substrate 10 larger than the counter substrate 20 are bonded to each other through a sealing material 40 that is in the form of substantially rectangular frame in a plan view.

The sealing material 40 in the liquid crystal device 100b has a liquid crystal inlet 41 through which a liquid crystal will be injected after the element substrate 10 and the counter substrate 20 are bonded together during production. The liquid crystal inlet 41 is sealed with a sealant 42 after the injection of liquid crystal.

In this embodiment, as illustrated in FIG. 5, the gas barrier layer 90a composed of a moistureproof resin layer 94 and an inorganic film layer 93 is disposed to cover the outside of the spacing between the pair of substrates 10 and 20 which have misaligned lateral sides. In detail, the moistureproof resin layer 94 is disposed to cover the spacing between the pair of substrates 10 and 20 as well as a portion of the element substrate 10 opposed to the counter substrate 20. Similarly in this embodiment, an outer portion of the moistureproof resin layer 94 is planarized. On the other hand, the inorganic film layer 93 is disposed to cover the entirety of the planarized side of the moistureproof resin layer 94 from outside. In this embodiment too, an gap region 60 is defined between the sealing material 40 and the moistureproof resin layer 94 similarly to the first embodiment.

The liquid crystal device 100b according to this embodiment achieves similar effects to the liquid crystal device 100a of the first embodiment. Even though the pair of substrates 10 and 20 have different sizes, the gap region 60 traps a gas generated from the resin component such as the gas barrier layer 90a or the sealing material 40 to suppress the generation of bubbles in the liquid crystal 50. Further, uncured components or nonvolatile impurities eluted from the moistureproof resin layer 94 can be trapped by the gap region 60, and thus the liquid crystal can be suppressed from misalignment by impurities.

C: Third Embodiment

Figure 6A:
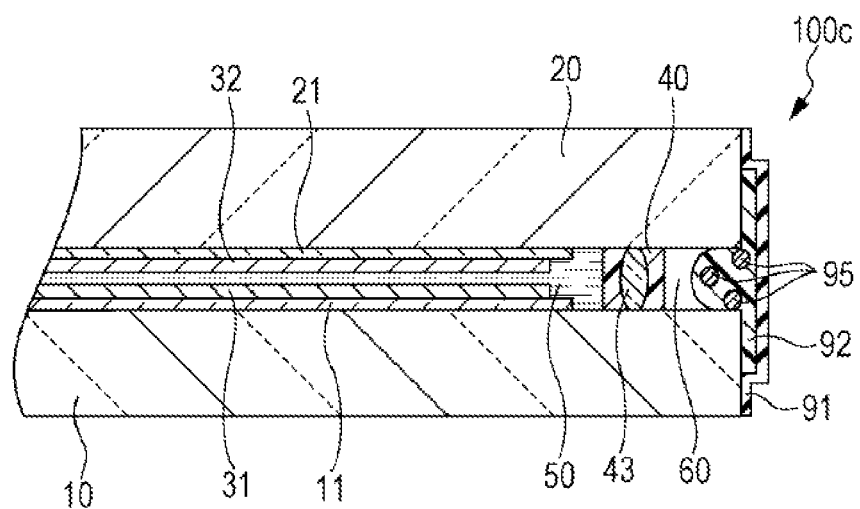
FIGS. 6A and 6B are schematic sectional views illustrating structures of liquid crystal devices according to a third embodiment of the invention.
Figure 6B:
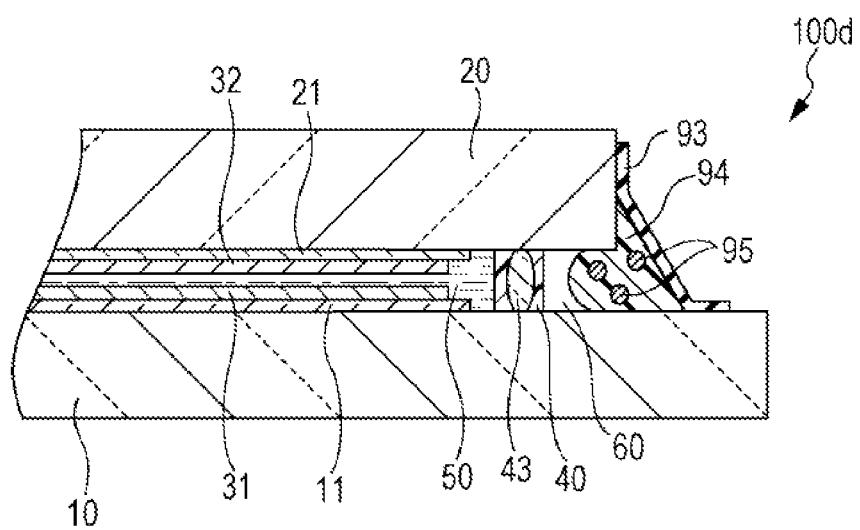

Liquid crystal devices 100c and 100d according to the third embodiment are similar to the liquid crystal devices 100a and 100b of the first embodiment and the second embodiment, except that the liquid crystal devices 100c and 100d of the third embodiment contain filler particles 95 in the gas barrier layer. FIGS. 6A and 6B are schematic sectional views illustrating exemplary structures of the liquid crystal devices 100c and 100d according to the third embodiment.

In the liquid crystal devices 100c and 100d of this embodiment, as illustrated in FIGS. 6A and 6B, a gap material 43 such as glass fibers or glass beads is disposed to control the distance between the substrates to a prescribed value, for example, 1.5 μm to 3.5 μm. On the other hand, moistureproof resin layers 92 and 94 contain filler particles 95 having a smaller diameter than the gap material 43. Examples of the filler particles 95 include silica, alumina, mica and talc. The diameter of the filler component is preferably about 0.5 μm to 1.5 μm.

According to this embodiment, the filler component particles present in the moistureproof resin layer 92 or 94 have a smaller diameter than the gap material 43 contained in the sealing material 40. With this configuration, it becomes easy for the moistureproof resin layers 92 and 94 to impregnate the spacing between the two substrates and to fill the spacing while leaving the gap region 60; further, the filler particles 95 enhance the moisture proofness of the moistureproof resin layers 92 and 94.

D: Fourth Embodiment

Figure 7A:
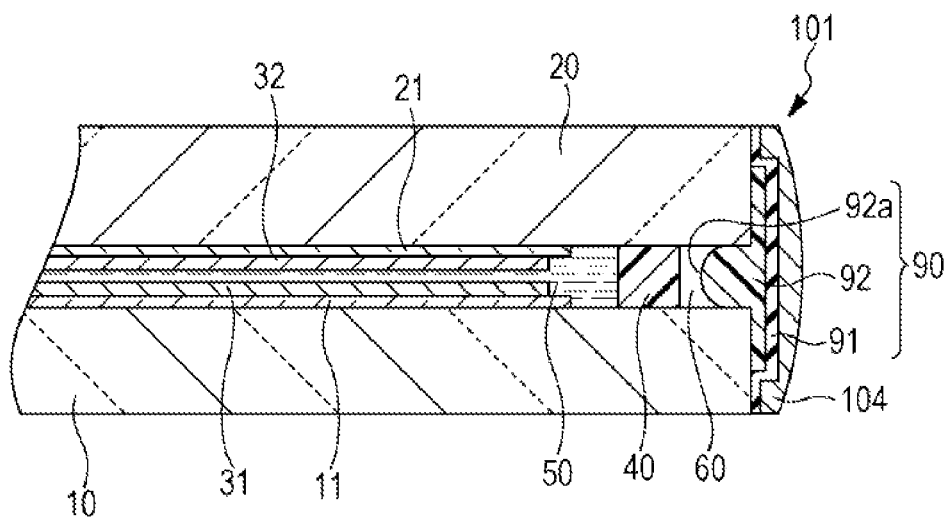
FIGS. 7A and 7B are schematic sectional views illustrating structures of liquid crystal devices according to a fourth embodiment of the invention.
Figure 7B:
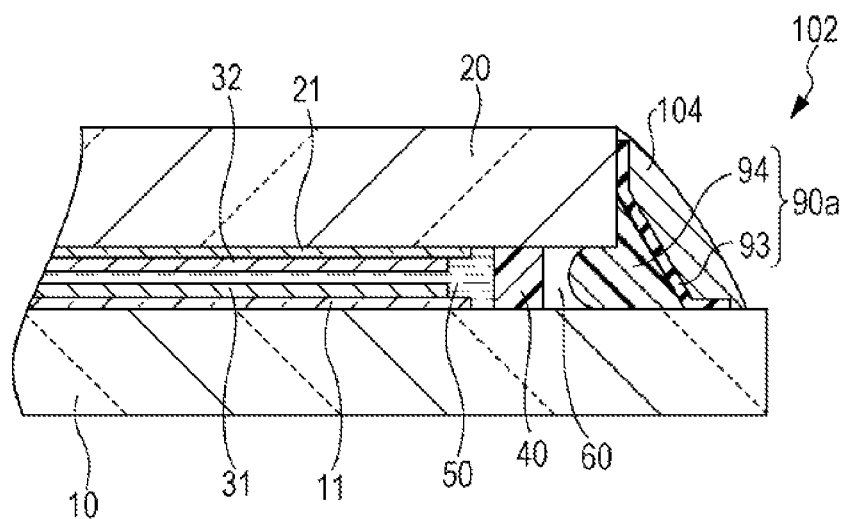

Liquid crystal devices 101 and 102 according to the fourth embodiment are similar to the liquid crystal devices 100a and 100b of the first embodiment and the second embodiment, except that the liquid crystal devices of this embodiment have a hybrid moistureproof layer 104. FIG. 7A illustrates an example of the liquid crystal device 101 having the configuration of the liquid crystal device 100a of the first embodiment plus a hybrid moistureproof layer 104. FIG. 7B illustrates an example of the liquid crystal device 102 having the configuration of the liquid crystal device 100b of the second embodiment plus a hybrid moistureproof layer 104.

In the liquid crystal devices 101 and 102, as illustrated in FIGS. 7A and 7B, the hybrid moistureproof layer 104 is disposed to cover the entire surface of the inorganic film layer 91 or 93. An example of the materials for the hybrid moistureproof layer 104 is an organic inorganic hybrid material having a molecule in which both an organic component and an inorganic component are present. In detail, siloxane-based organic inorganic hybrid materials such as polydimethylsiloxane and polysilsesquioxane may be used.

The liquid crystal devices 101 and 102 according to this embodiment achieve similar effects to the liquid crystal devices 100a and 100b of the first embodiment and the second embodiment. Further, the hybrid moistureproof layer 104 disposed to cover the inorganic film layer 91 or 93 protects the inorganic film layer 91 or 93 even when the inorganic film layer 91 or 93 is made of, for example, a substance with low grinding resistance such as aluminum or silver, thereby maintaining moisture proofness. Furthermore, because the hybrid moistureproof layer 104 is made of an organic inorganic hybrid material, higher moisture proofness compared to that provided by an inorganic material alone is exhibited.

A hybrid moistureproof layer 104 may be disposed to cover the respective entire surfaces of the inorganic film layers 91 and 93 in the liquid crystal devices 100c and 100d according to the third embodiment illustrated in FIGS. 6A and 6B.

E: Modified Embodiment

The embodiments discussed above may be modified in various ways. Such modified embodiments will be described below as specific examples. Any two or more of the following exemplary embodiments may be combined appropriately without contradicting one another. FIGS. 8A and 8B and FIGS. 9A and 9B are schematic sectional views illustrating structures of liquid crystal devices according to modified embodiments. FIGS. 10A and 10B are schematic plan views illustrating structures of liquid crystal devices according to modified embodiments.

(1) In the liquid crystal device 100a of the first embodiment described above, the gap region 60 is defined to be curved inwardly away from the gas barrier layer 90. However, a liquid crystal device 100e may be configured, for example as illustrated in FIG. 8A, such that an gap region 61 is defined to be curved outwardly toward the gas barrier layer 90.

(2) In the aforementioned first and second embodiments, as illustrated in FIG. 2, the gap region 60 is defined as a space in which there is no contact between the lateral side of the sealing material 40 and the inner surface of the moistureproof resin layer 92 in a side view. However, the scope of the invention is not limited to this, and the configurations such as the position, the range, the size and the shape of the gap region may be changed appropriately as long as the gap region is formed somewhere between the sealing material 40 and the gas barrier layer 90. For example, a liquid crystal device 100f may be configured as illustrated in FIG. 8B in which a local gap region 62 is defined to be free from contact with the inner surfaces of the pair of substrates 10 and 20 and to be located only within the lateral side of the sealing material 40.

Figure 9A:
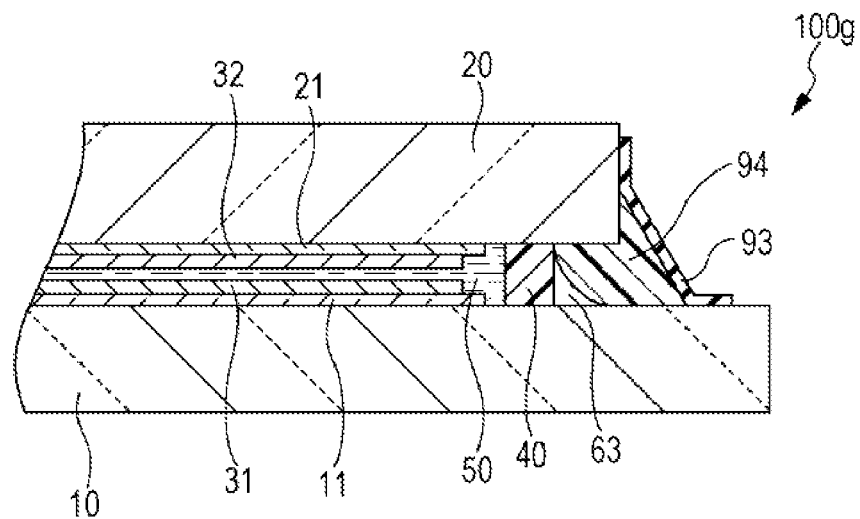
FIGS. 9A and 9B are schematic sectional views illustrating structures of liquid crystal devices according to modified embodiments.
Figure 9B:
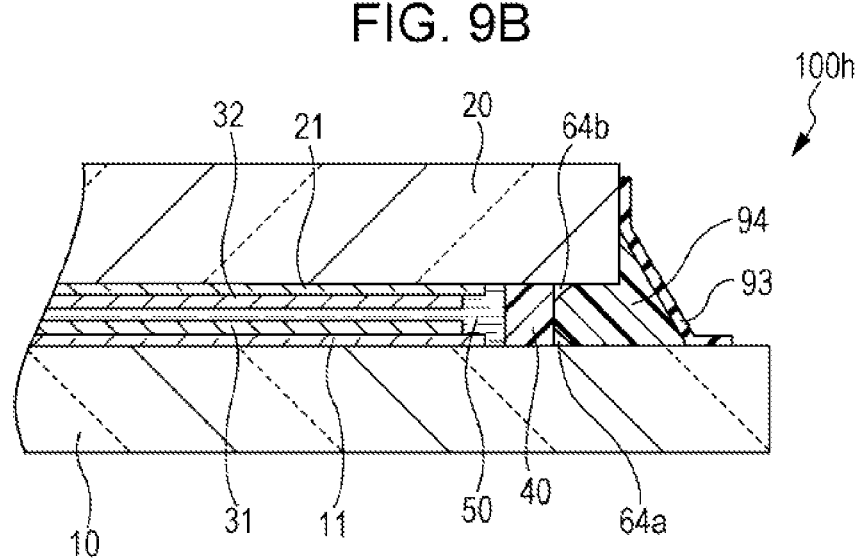
Figure 10A:
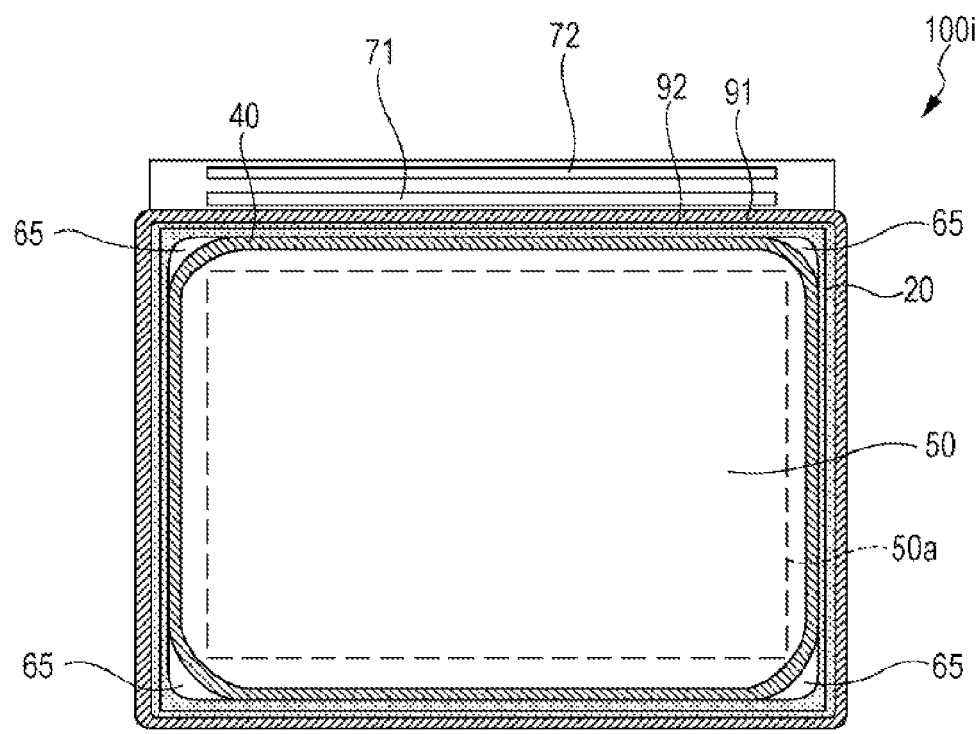
FIGS. 10A and 10B are schematic plan views illustrating structures of liquid crystal devices according to modified embodiments.
Figure 10B:
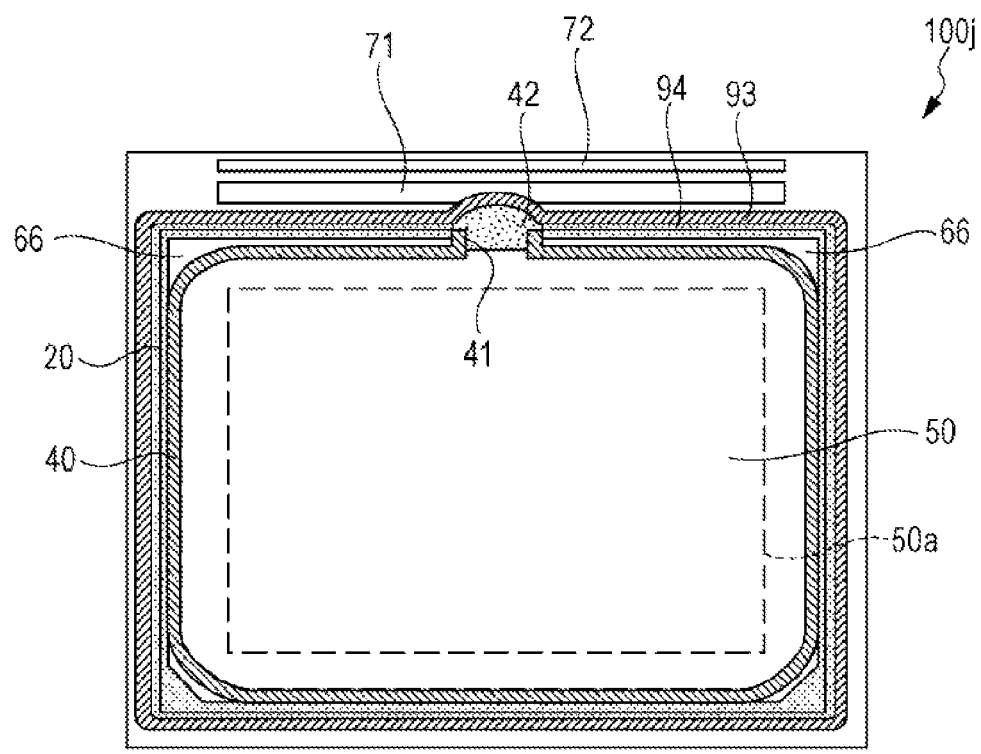

Another configuration of the gap regions is illustrated in FIG. 9A. In this liquid crystal device 100g, an gap region 63 is defined locally on the downside by the inner surface of the element substrate 10 and the lateral side of the sealing material 40 on the gas barrier layer 90 side. Further, as illustrated in FIG. 9B, a liquid crystal device 100h may be configured such that a moistureproof resin layer 94 is in contact with a central portion of the lateral side of the sealing material 40, and thus an gap region 64a is defined by the inner surface of the element substrate 10 and the lateral side of the sealing material 40 and an gap region 64b is defined by the inner surface of the counter substrate 20 and the lateral side of the sealing material 40. Regarding these gap regions 63 and 64 (64a and 64b), it is preferable that when the ends of the substrates 10 and 20 are not aligned (in the illustrated examples, the lower element substrate 10 extends to a longer length), the inorganic film layer 93 be disposed to be inclined outwardly from the end of the upper counter substrate 20 to the top surface (the inner surface) of the lower element substrate 10.

(3) In the first and second embodiments discussed above, the gap region 60 is defined in a frame shape enclosing the entirety of the outer periphery of the sealing material 40 in a plan view. However, the invention is not limited to this as long as the gap region is defined at a portion of the outer periphery. For example, a liquid crystal device 100i may be configured as illustrated in FIG. 10A in which the four corners of the sealing material 40 are curved in a plan view and gap regions 65 are provided only at the outsides of the curved four corners. Alternatively, a liquid crystal device 100j may be configured as illustrated in FIG. 10B in which gap regions 66 are provided only on the side in which the liquid crystal inlet 41 is disposed in the sealing material 40.

According to these modified embodiments, the gap regions 61 to 66 are disposed in at least a portion of the space between the sealing material 40 and the moistureproof resin layer 92 or 94. Thus, a gas generated from the moistureproof resin layer 92 or 94 or from the sealing material 40 is trapped by the gap regions 61 to 66 to suppress the generation of bubbles in the liquid crystal 50 and to suppress the misalignment of liquid crystal due to impurities coming from the moistureproof resin layer.

In particular, the misalignment of liquid crystal can be suppressed by forming the gap regions 65 at the four corners of the sealing material 40 as illustrated in FIG. 10A. In detail, an image display region 50a is substantially rectangular with four rectangular corners; on the other hand, the four corners of the sealing material 40 are curved because substrate-conducting materials composed of conductive particles are disposed at the four corners of the counter substrate 20 to establish an electrical conduction between the element substrate 10 and the counter substrate 20. Thus, as illustrated in FIGS. 10A and 10B, the distance between the image display region 50a and the sealing material 40 is shorter at the four corners than at the lateral sides. As a result, the four corners of the image display region 50a are more susceptible to influences of gases and impurities generated from the sealing material, and the misalignment of liquid crystal occurs easily. In the modified embodiments, as illustrated in FIG. 10A, the gap regions 65 are disposed at the four corners of the sealing material 40 and thus the misalignment of liquid crystal at the four corners can be suppressed.

Although the above embodiments have been illustrated with respect to liquid crystal devices as an example, the invention is not limited thereto and may be applied to electro-optical devices other than liquid crystal devices which involve electro-optical substances whose optical characteristics are changed by electrical energy. For example, the electro-optical devices may be light-emitting devices having organic electro-luminescence (EL) elements. The emission characteristics of organic EL elements are deteriorated by water. The use of the gas barrier layers described in the above embodiments may remedy the decrease in display quality.

F: Application Examples

Figure 11:
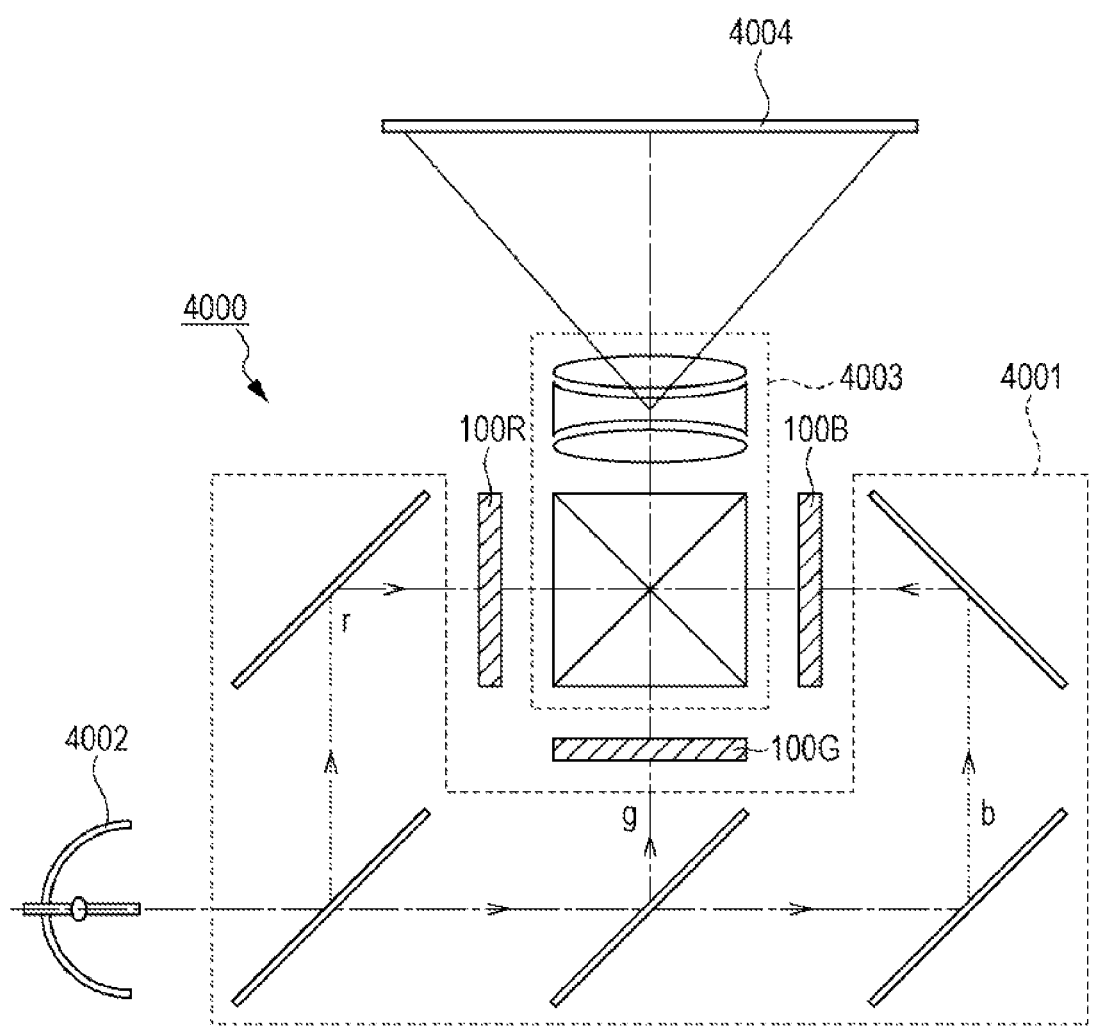
FIG. 11 is a perspective view of an electronic apparatus (a projection display device).
Figure 12:
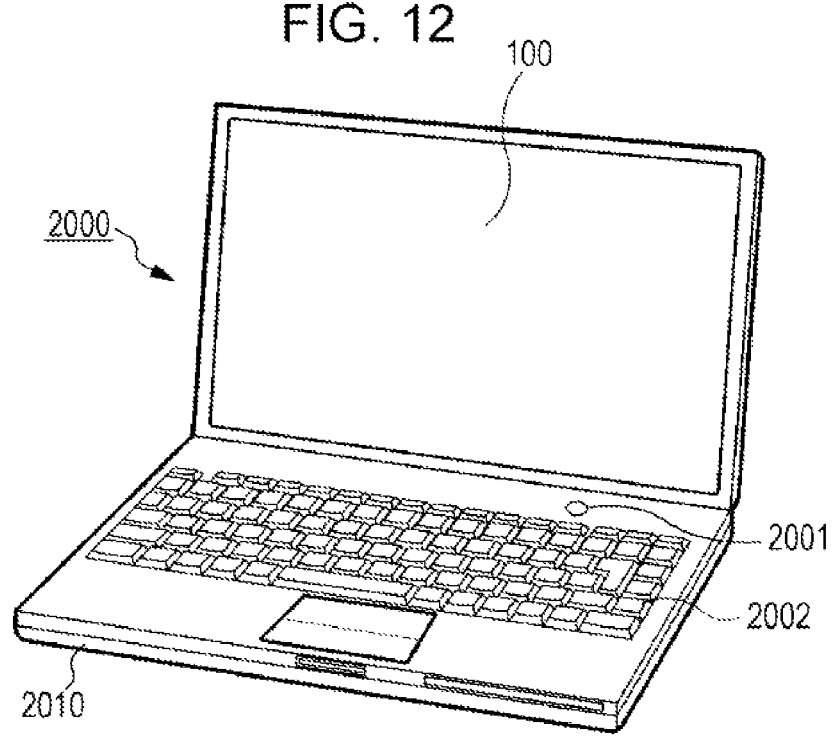
FIG. 12 is a perspective view of an electronic apparatus (a personal computer).
Figure 13:
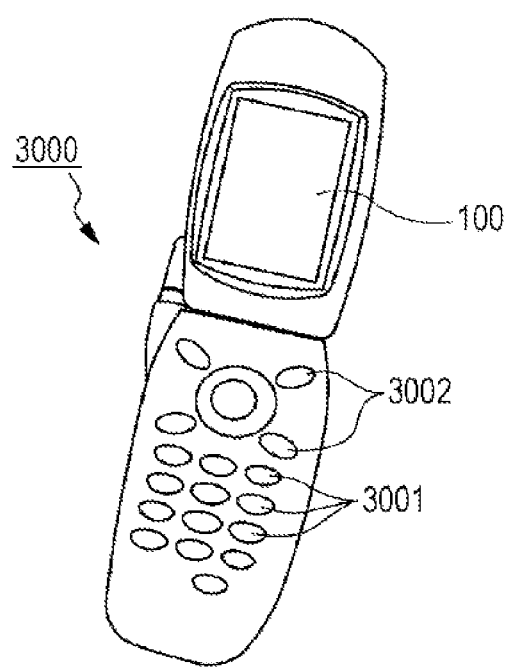
FIG. 13 is a perspective view of an electronic apparatus (a mobile phone).

The liquid crystal devices 100 (including 100a to 100j as well as 101 and 102) illustrated in the above embodiments and modified embodiments may be utilized in various electronic apparatuses. FIGS. 11 to 13 illustrate specific examples of the electronic apparatuses utilizing the liquid crystal devices 100.

FIG. 11 is a schematic view of a projection display device (a three-plate projector) 4000 involving the liquid crystal devices 100. The projection display device 4000 includes three liquid crystal devices 100 (100R, 100G and 100B) corresponding to different display colors (red, green and blue). An illumination optical system 4001 is configured such that the light emitted from an illuminating device (a light source) 4002 is separated into a red component r which is supplied to the liquid crystal device 100R, a green component g supplied to the liquid crystal device 100G, and a blue component b supplied to the liquid crystal device 100B. Each liquid crystal device 100 functions as an optical modulator (a light valve) that modulates the monochromatic light supplied from the illumination optical system 4001 in accordance with the image to be displayed. A projection optical system 4003 synthesizes the lights emitted from the liquid crystal devices 100 and projects the synthesized light on a projection surface 4004.

FIG. 12 is a perspective view of a mobile personal computer involving the liquid crystal device 100. The personal computer 2000 includes the liquid crystal device 100 configured to display various images, and a main body 2010 having mounted thereon a power switch 2001 and a keyboard 2002.

FIG. 13 is a perspective view of a mobile phone involving the liquid crystal device 100. The mobile phone 3000 includes a plurality of operation buttons 3001 and scroll buttons 3002, and the liquid crystal device 100 configured to display various images. The image displayed on the liquid crystal device 100 is scrolled by the operation of the scroll buttons 3002.

Further, the structures according to the invention may be applied to other electronic apparatuses such as recording and reproducing devices, for example, optical pickups. That is, the inventive configurations may be applied to liquid crystal elements that serve as liquid crystal aberration correcting elements to actively control the wavefront of laser light. In this case, information recorded on optical disks may be reproduced, or information may be recorded onto optical disks by the operation of laser light sources while ensuring that the record is not degraded by problems in the liquid crystal elements due to the absorption of water from outside or the entry of water from outside. Thus, optical pickups having high precision may be provided.

Examples of the electronic apparatuses to which the liquid crystal devices of the invention may be applied include, in addition to the apparatuses illustrated in FIGS. 11 to 13, personal digital assistants (PDA), digital still cameras, television sets, video cameras, car navigation systems, automobile indicators (instrument panels), electronic notebooks, electronic papers, calculators, word processors, workstations, videophones, POS terminals, printers, scanners, copying machines, video players and touch panels.

The entire disclosure of Japanese Patent Application No. 2013-063534, filed Mar. 26, 2013 is expressly incorporated by reference herein.

What is claimed is:

1. An electro-optical device, comprising:
   a first substrate;
   a second substrate;
   an electro-optical substance disposed between the first substrate and the second substrate;
   a sealing material disposed in a spacing between the first substrate and the second substrate and surrounding a periphery of the electro-optical substance;
   a moistureproof resin layer disposed outside of the sealing material and having a portion located in the spacing, the portion located in the spacing having a concave curved surface; and
   a gap region defined in at least a portion of a space between the sealing material and the moistureproof resin layer,
   wherein
      the moistureproof resin layer contacts a first substrate inner surface that faces the second substrate, a second substrate inner surface that faces the first substrate, and a first portion of the sealing material, such that the gap region is defined between the moistureproof resin layer and a second portion of the sealing material that does not contact the moistureproof resin layer, and
      the gap region is only disposed midway between the first substrate and the second substrate such that the moisture proof resin layer is disposed both between the gap region and the first substrate inner surface and between the gap region and the second substrate inner surface.

2. The electro-optical device according to claim 1, further comprising an inorganic film layer disposed outside of the moistureproof resin layer and at least partially in contact with the outer surface of the moistureproof resin layer.

3. The electro-optical device according to claim 2, wherein the moistureproof resin layer includes at least one of a one-part photocurable resin, a photo- and heat-curable resin and a two-part cold-curable resin, and is electrically insulating.

4. The electro-optical device according to claim 3, wherein the moistureproof resin layer includes an epoxy resin or a modified epoxy resin.

5. The electro-optical device according to claim 2, wherein the inorganic film layer has a film thickness of not less than 0.1 μm and not more than 2.5 μm.

6. The electro-optical device according to claim 2, wherein the inorganic film layer includes aluminum or chromium.

7. An electronic apparatus comprising the electro-optical device of claim 2.

8. An electronic apparatus comprising the electro-optical device of claim 1.

* * * * *